United States Patent [19]

Klomp

[11] Patent Number: 4,708,400

[45] Date of Patent: Nov. 24, 1987

[54] SPARE TIRE INSTALLATION WITHOUT CONVENTIONAL JACK

[75] Inventor: Edward D. Klomp, Mt. Clemens, Mich.

[73] Assignee: General Motors Corporation, Detroit, Mich.

[21] Appl. No.: 935,980

[22] Filed: Nov. 28, 1986

[51] Int. Cl.⁴ .............................................. B60B 11/00
[52] U.S. Cl. .................................. 301/38 S; 301/38 R; 152/216; 254/1
[58] Field of Search ...................... 254/1; 152/152, 155, 152/156, 213 R, 213 A, 216, 251, 516; 301/38 S, 38 R, 39 R, 40 S; 29/273

[56] References Cited

U.S. PATENT DOCUMENTS 1,263,375  4/1918  Clarke ................................ 301/38 R
3,770,323  11/1973 Isaacson ............................. 301/38 R
3,894,774  7/1975  Bonomo .............................. 301/38 R
4,120,336  10/1978 Baskall .................................. 152/216

FOREIGN PATENT DOCUMENTS 1480751  8/1969  Fed. Rep. of Germany .... 301/38 R
2028239  3/1980  United Kingdom ............. 301/38 R Primary Examiner—Frederick R. Schmidt
Assistant Examiner—Judy J. Hartman
Attorney, Agent, or Firm—Ernest E. Helms

[57] ABSTRACT

The present invention provides a spare tire apparatus for installation on a vehicle. The spare tire can be installed to a vehicle without the use of a conventional jack and can use the motion of the vehicle to secure itself to the vehicle. The inventive spare tire does not require removal of the flat tire which is attached with the vehicle.

8 Claims, 4 Drawing Figures

SPARE TIRE INSTALLATION WITHOUT CONVENTIONAL JACK

FIELD OF THE INVENTION

The field of the present invention is that of vehicle spare tires and methods of installation of the same.

DISCLOSURE STATEMENT

It is not uncommon for pneumatic tires to go flat. The usual method of changing a flat tire requires that the vehicle be elevated by a jack. The nuts that secure the tire wheel to the vehicle are then removed and the tire along with its wheel is then removed. A replacement tire and wheel combination or temporary spare tire and wheel is then fitted on the vehicle and the wheel nuts are torqued. After the above procedure is complete, the vehicle is then lowered by the jack. The above technique requires handling of a dirty flat tire which can easily spoil the clothing of the individual changing the tire. Changing the tire is still more unpleasant when the flat tire is wet and/or muddy during inclement weather.

SUMMARY OF THE INVENTION

To overcome the above-noted and other problems the present invention is brought forth. The present invention provides a vehicle wheel and tire jacking system wherein the spare tire may be applied to the vehicle without the removal of the flat tire. The present invention also provides a method of applying the inventive spare tire without the use of a conventional jack. Also, by the use of the present invention the spare tire may be installed to the vehicle using the power of the vehicle itself. The present invention includes a hub which is attached to the outside of the vehicle wheel with a conical surface projecting away from the vehicle wheel. Pivotally and nonrotatably connected to the hub is a threaded rod. The spare tire has a conical surface projecting toward the vehicle wheel and has a central aperture for insertion of the rod. Captured between the hub and the tire is a generally spherical insert which surrounds the rod. Adjacent to the tire, opposite the vehicle wheel and threadedly mounted on the rod, is a nut. Relative rotation between the nut and the vehicle wheel causes the tire to be cammed into a position to be coaxially joined to the vehicle wheel.

It is an object of the present invention to provide a spare tire and method of installation of the same. It is another object of the present invention to provide a method to install a spare tire without the use of a conventional jack.

It is yet another object of the present invention to provide a vehicle wheel tire jacking system, including a hub for attachment to the vehicle wheel with a conical surface projecting away from the vehicle wheel, a threaded rod pivotally and nonrotatively connected with the hub, a tire with a conical surface projecting toward the vehicle wheel with a central aperture, a nut threaded on the rod adjacent the tire opposite the vehicle wheel having a spherical portion pivotally nested in the periphery of the aperture of the tire, a generally spherical insert surrounding the rod and held to the tire by a removable pin and captured between the tire and the hub, and a ratcheted head wrench attached to the vehicle for restraining rotation of the nut whereby movement of the vehicle causes the tire to be joined to the wheel in a position coaxial with the wheel.

It is still yet another object of the present invention to provide a method to coaxially join a tire to a vehicle wheel without the use of a conventional jack, the method including attaching a hub with a conical surface projecting away from the vehicle wheel to the vehicle wheel, pivotally and nonrotatively connecting with the hub a threaded rod, surrounding the threaded rod with a tire having a central aperture and a conical surface projecting toward the vehicle wheel, surrounding the rod with a generally spherical insert captured between the tire and the hub, restraining a nut threaded on the rod adjacent to the tire opposite the vehicle wheel from rotation and moving the vehicle whereby the tire is joined to the vehicle wheel in a position coaxial with the vehicle wheel.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
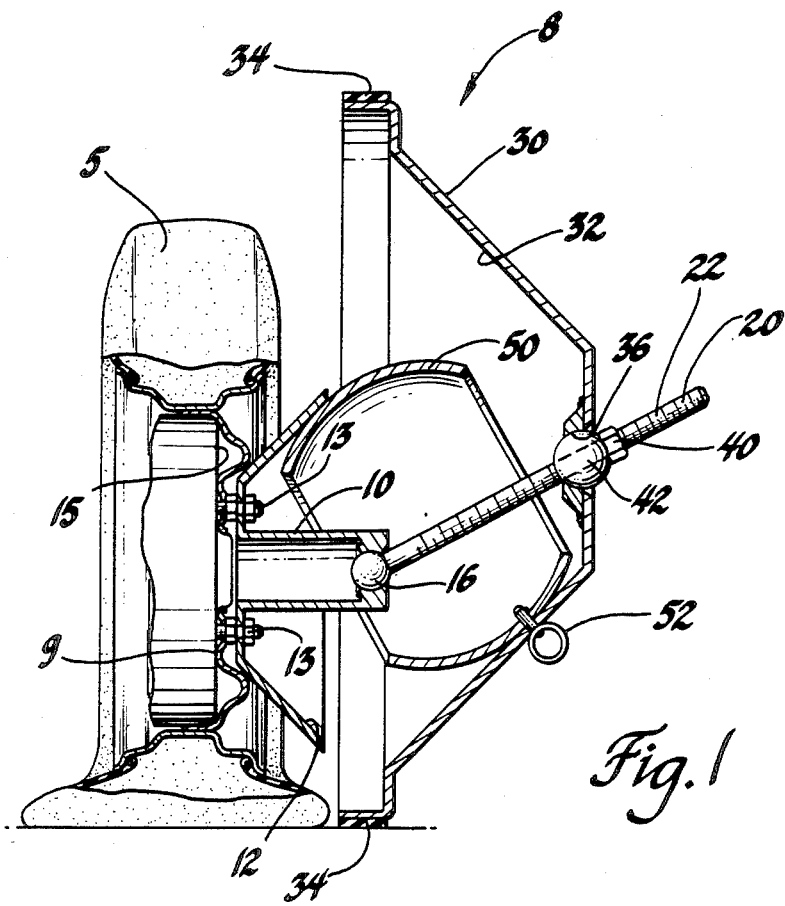
FIG. 1 is a sectional view illustrating the hub being installed and the tire being added.
Figure 2:
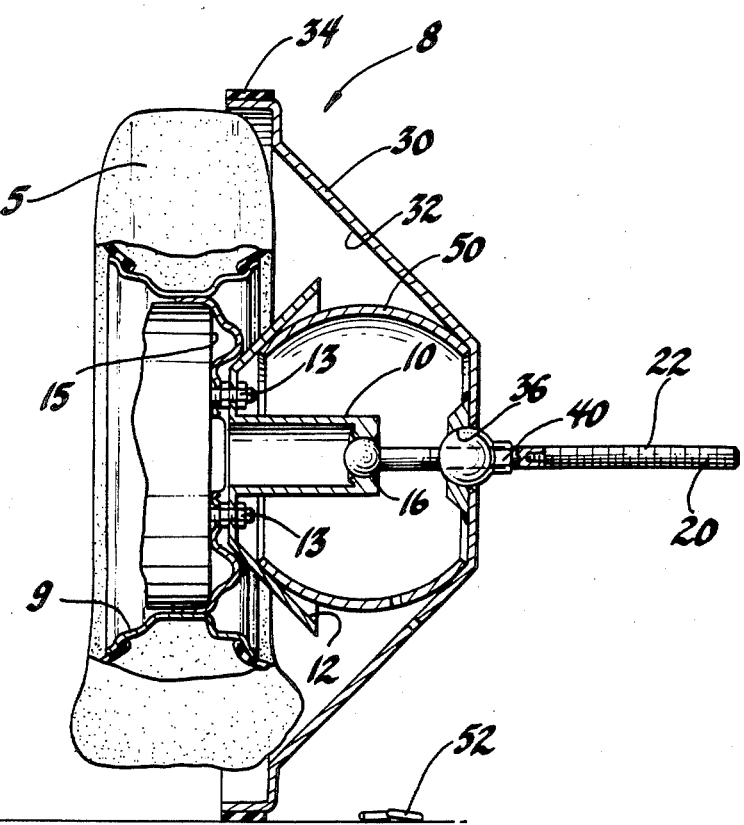
FIG. 2 is a sectional view illustrating completion of the installation of the tire.

Referring to FIGS. 1 and 2, a preferred embodiment of the present inventive vehicle tire jacking system 8 includes a hub 10 which is attached to the vehicle wheel 9 having a conical surface 12 projecting away from the vehicle wheel 9. A threaded rod 20 is pivotally and nonrotatively connected with the hub 10. The spare tire 30 has a conical surface 32 projecting toward the vehicle wheel 9 with a central aperture 36. A nut 40 is threaded adjacent to the tire 30 opposite the vehicle wheel 9. Captured between the hub 10 and the tire 30 and surrounding the rod 20, is a generally spherical insert 50. Relative rotational movement between the nut 40 and the vehicle wheel 9 causes the tire 30 to be coaxially joined to the vehicle wheel 9.

The hub 10 is directly attached to the vehicle wheel 9. Hub 10 will usually have a diameter smaller than the diameter of vehicle wheel 9 since the vehicle wheel 9 is usually resting adjacent to the ground when the originally installed tire 5 is flat. Although not required, it is usually preferable that the vehicle have threaded wheel lugs 13 somewhat longer than conventional threaded lugs so that the hub 10 may be boltably secured to the vehicle wheel rotor or brake drum 15 without removing of the vehicle wheel 9.

The hub 10 has pivotally and nonrotatively joined thereto the rod 20. Typically, the joint 16 of the rod 20 with the hub 10 is a Rzeppa joint. The rod 20 has a threadably removable extension 22 (FIG. 2) which allows the rod 20 to be shortened after installation.

The tire 30 is typically mainly metallic and has a rubber tread 34 joined thereto along its outer periphery. The tire 30 also has a conical surface 32 which opens towards the vehicle wheel 9. The tire 30 surrounds the rod 20 and rod 20 projects through the tire central aperture 36.

Joined to the tire 30 (FIG. 1) for installation is a generally spherical insert 50. A pin 52 provides the removable means of holding the insert 50 to the tire 30 when installing tire 30. After the insert 50 is captured between the hub 10 and tire 30, the pin 52 is manually pulled out or allowed to break away. The insert 50 also surrounds the rod 20.

Threadedly inserted on the rod 20 adjacent to the tire 30 opposite the vehicle wheel 9 is the nut 40.

The nut has a generally spherical end 42 which is pivotally nested in the periphery of the central aperture 36 of the tire 30. Relative rotation between the nut 40 and the vehicle wheel 9 will cause the tire 30 to be cammed from a position of FIG. 1 to a position of FIG. 2, coaxially joined with the vehicle wheel 9.

Figure 3:
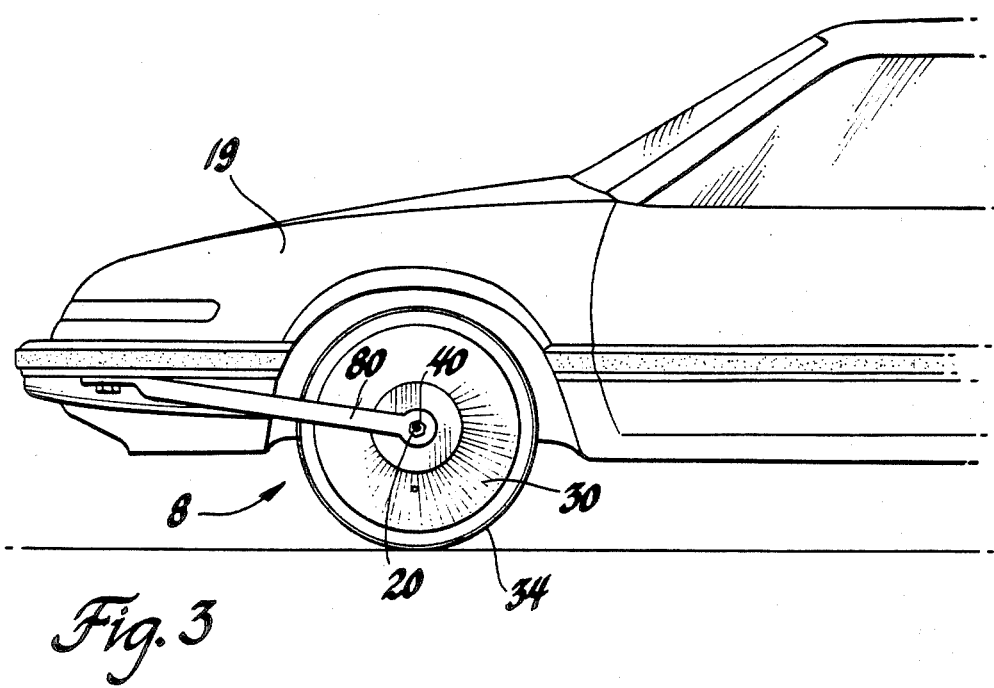
FIG. 3 is a side elevational view illustrating installation of the tire as the vehicle is moving with a wrench, attached to the car, restraining the nut.
Figure 4:
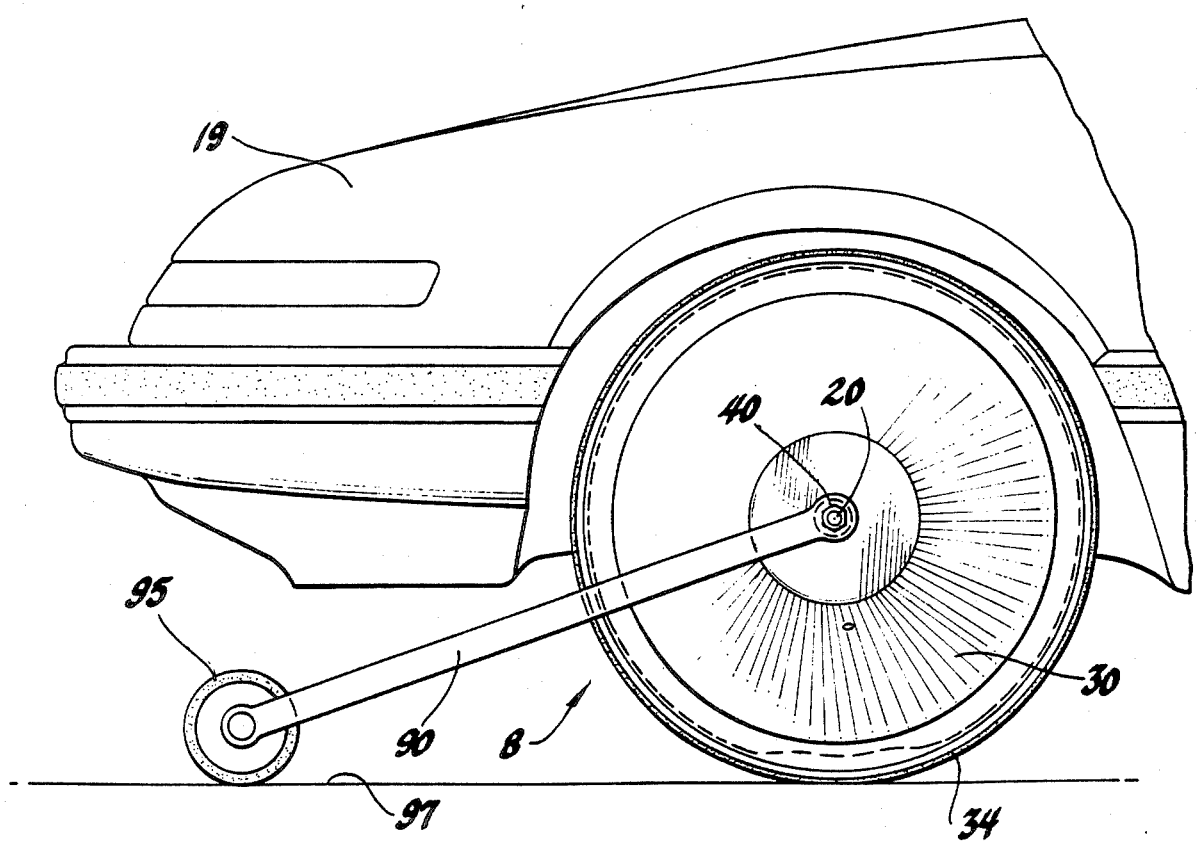
FIG. 4 is a side elevational view illustrating installation of the tire as the vehicle is moving with a wrench having an end to mate with a fixed surface restraining the nut.

The relative rotation between the nut 40 and the vehicle wheel 9 can be accomplished in a number of methods. One method is to simplify torque nut 40 on rod 20. In a second method a wrench 80 (FIG. 3) is attached with the vehicle bumper. The wrench 80 provides the means to restrain rotation of nut 40 and the vehicle 19 moved under its own power causing the tire 30 to be attached. It is usually preferable that the wrench 80 be ratcheted to release the nut 40 upon a predetermined torsional value. Referring to FIG. 4, the wrench 90 has a head to restrain rotation the nut 40 as previously described. Wrench 90 also has at an opposite end, a surface (usually a roller 95) to mate with a fixed surface 97 (pavement) to provide the required leverage to restrain nut 40 from rotation as the vehicle 19 is moved under its own power.

The present invention provides a method to coaxially join a tire 20 to a vehicle wheel 9 without the use of a conventional jack including the following steps:

1. Attaching a hub 10 with a conical surface 12 projecting away from the vehicle wheel 9 to the vehicle wheel 9;

2. Pivotally and nonrotatively connecting with the hub 10 a rod 20;

3. Surrounding the rod 20 with a tire 30 with a central aperture 36 and a conical surface 32 projecting toward the vehicle wheel;

4. Surrounding the rod 20 with a generally spherical insert 50 captured between the tire 30 and hub 10;

5. Threading a nut 40 on the rod 20 adjacent to the tire 30 opposite the vehicle wheel 9;

6. Relatively rotating the nut 40 with respect to the vehicle wheel 9 whereby the tire 30 is joined to the vehicle wheel 9 in a position coaxial with said vehicle wheel 9.

While a few of the embodiments of the present invention have been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle wheel tire jacking system, said system in combination comprising:
    a hub for attachment to said vehicle wheel with a conical surface projecting away from said vehicle wheel;
    a threaded rod pivotally and nonrotatively connected with said hub;
    a tire with a conical surface projecting toward said vehicle wheel with a central aperture;
    a nut threaded on said rod adjacent said tire opposite vehicle wheel; and
    a generally spherical insert surrounding said rod captured between conical surface of said tire and said hub whereby relative rotational movement between said nut and said hub causes said nut to move axially on said rod to cause said tire to be joined to said wheel in a position coaxial with said wheel.

2. A vehicle wheel tire jacking system as described in claim 1 further including removable means for holding said insert to said tire.

3. A vehicle wheel tire jacking system as described in claim 1 wherein said nut has a generally spherical end pivotally nested within the periphery of the aperture of said tire.

4. A vehicle wheel tire jacking system, said system in combination comprising:
    a hub for attachment to said vehicle wheel with a conical surface projecting away from said vehicle wheel;
    a threaded rod pivotally and nonrotatively connected with said hub;
    a tire with a conical surface projecting toward said vehicle wheel with a central aperture;
    a nut threaded on said rod adjacent said tire opposite said vehicle wheel;
    a generally spherical insert surrounding said rod captured between conical surfaces of said tire and said hub; and
    means to restrain rotation of said nut whereby rotational movement of said vehicle wheel causes said nut to move axially on said rod to cause said tire to be joined to said wheel in a position coaxial with said wheel.

5. A vehicle wheel tire jacking system as described in claim 4 wherein said means to restrain rotation of said nut is ratcheted to release said nut upon a predetermined torsional value.

6. A vehicle wheel tire jacking system as described in claim 4 wherein said means to restrain rotation of said nut is a wrench attached with said vehicle.

7. A vehicle wheel tire jacking system as described in claim 4 wherein said means to restrain rotation of said nut is a wrench having at one end a head to hold said nut and on the opposite end a surface to mate with a fixed surface.

8. A vehicle wheel tire jacking system, said system in combination comprising:
    a hub for attachment to said vehicle wheel with a conical surface projecting away from said vehicle wheel;
    a threaded rod pivotally and nonrotatively connected with said hub;
    a tire with a conical surface projecting toward said vehicle wheel with a central aperture;
    a nut threaded on said rod adjacent said tire opposite said vehicle wheel having a generally spherical portion pivotallly nested in the periphery of the aperture of said tire;
    a generally spherical insert surrounding said rod and held to said tire by a removable pin and captured between conical surface of said tire and said hub; and
    a ratcheted head wrench attached to said vehicle to restrain rotation of said nut whereby movement of said vehicle causes said nut to move axially on said rod to cause said tire to be joined to said wheel in a position coaxial with said wheel.

* * * * *